United States Patent
Kuo et al.

(10) Patent No.: US 9,535,509 B2
(45) Date of Patent: Jan. 3, 2017

(54) DEVICE AND METHOD FOR CREATING VIRTUAL KEYBOARD

(71) Applicant: HON HAI PRECISION INDUSTRY CO., LTD., New Taipei (TW)

(72) Inventors: Che-Ming Kuo, New Taipei (TW); Chih-Chung Chien, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/749,025

(22) Filed: Jun. 24, 2015

(65) Prior Publication Data

US 2016/0062477 A1 Mar. 3, 2016

(30) Foreign Application Priority Data

Aug. 28, 2014 (TW) .............................. 103129640 A

(51) Int. Cl.
G06F 3/02 (2006.01)
G06F 3/0488 (2013.01)
G06F 3/0489 (2013.01)
G06F 3/01 (2006.01)

(52) U.S. Cl.
CPC ............. *G06F 3/0216* (2013.01); *G06F 3/018* (2013.01); *G06F 3/0219* (2013.01); *G06F 3/0489* (2013.01); *G06F 3/04886* (2013.01)

(58) Field of Classification Search
None
See application file for complete search history.

(56) References Cited

U.S. PATENT DOCUMENTS

| | | | | |
|---|---|---|---|---|
| 5,625,354 A * | 4/1997 | Lerman | ................. | G06F 3/0219 341/20 |
| 6,646,572 B1 * | 11/2003 | Brand | ................... | G06F 3/0219 341/22 |
| 2012/0200503 A1 * | 8/2012 | Berenger | ............ | G06F 3/04886 345/168 |

* cited by examiner

*Primary Examiner* — Kenneth B Lee, Jr.
(74) *Attorney, Agent, or Firm* — Zhigang Ma

(57) ABSTRACT

In a method for creating a virtual keyboard, multiple intersections formed as a honeycomb structure are set on a plane. A selected type of virtual keyboard is acquired according to a command input by a user. A number of keys according to the selected type of virtual keyboard are calculated to acquire intersections corresponding to the number of the keys from the plane. The keys are arranged to form a keyboard plane of the virtual keyboard. A standard difference of step lengths from a center key of the keyboard plane to the other keys is calculated. The virtual keyboard is displayed on a screen of a display device, in event the keyboard plane is determined available according to the calculated standard difference. Then the user can operate the virtual keyboard with a remote control device to input characters.

15 Claims, 16 Drawing Sheets

DEVICE AND METHOD FOR CREATING VIRTUAL KEYBOARD

CROSS-REFERENCE TO RELATED APPLICATIONS

This application claims priority to Taiwanese Patent Application No. 103129640 filed on Aug. 28, 2014, the contents of which are incorporated by reference herein.

FIELD

The subject matter herein generally relates to input technology.

BACKGROUND

At present, a user of a set-top box (STB) or an internet protocol television (IPTV) without a standard keyboard may operate a virtual keyboard with a remote control device to input characters. The user should press directional control buttons of the remote control device to select keys corresponding to the characters. However, the present virtual keyboard is quadrate. If the keys corresponding to the characters are far away from each other, the remote control device buttons must be pressed many times. For example, if the user wants to input a word "WORLD", he/she should press the remote control device 29 times.

BRIEF DESCRIPTION OF THE DRAWINGS

Implementations of the present technology will now be described, by way of example only, with reference to the attached figures, wherein:

FIG. 11 illustrates a diagrammatic view of an embodiment of step lengths from a center key to the other keys of a present phonetic notation keyboard.

FIG. 12 illustrates a diagrammatic view of an embodiment of step lengths from a center key to the other keys of a present English keyboard.

FIG. 13 illustrates a diagrammatic view of an embodiment of step lengths from a center key to the other keys of a present numeric keyboard.

DETAILED DESCRIPTION

Figure 1:
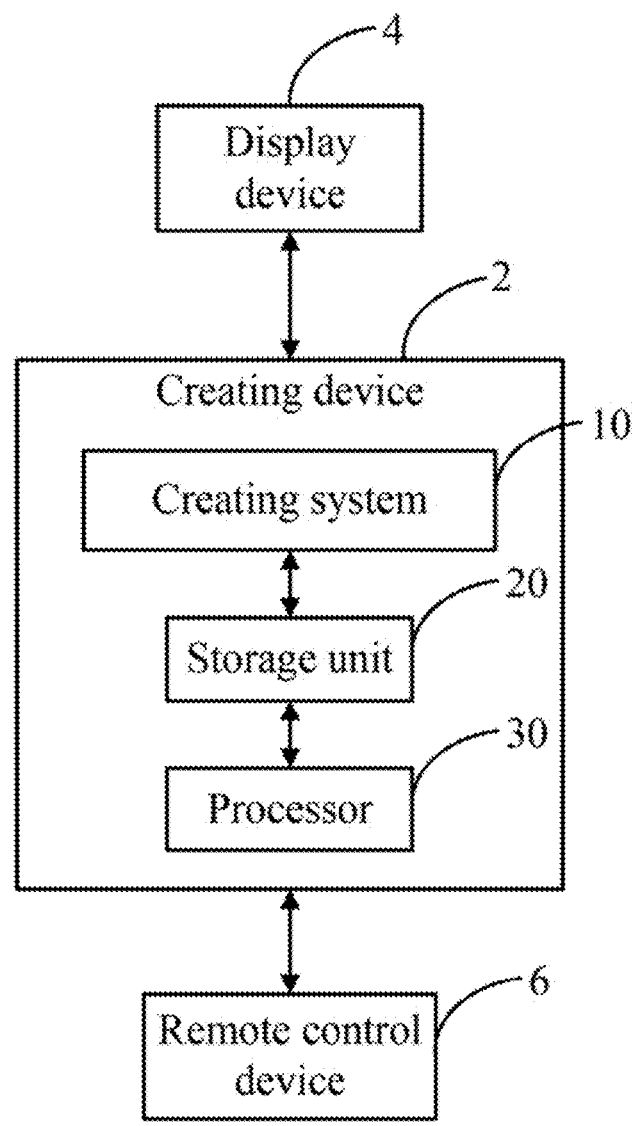
FIG. 1 illustrates a block diagram of an embodiment of a creating device including a creating system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one."

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series and the like.

FIG. 1 illustrates a block diagram of an embodiment of a creating device 2. In the embodiment, the creating device 2 includes a creating system 10, a storage unit 20, and a processor 30. The creating device 2 is electronically connected to a display device 4 and a remote control device 6. In the embodiment, the creating device 2 creates a virtual keyboard and transmits the virtual keyboard to the display device 4 for display. A user may use the remote control device 6 to select a key of the virtual keyboard, to input a corresponding character. The creating device 2 can be a set-top box (STB), and the display device 4 can be a smart TV, but the disclosure is not limited thereto.

Figure 2:
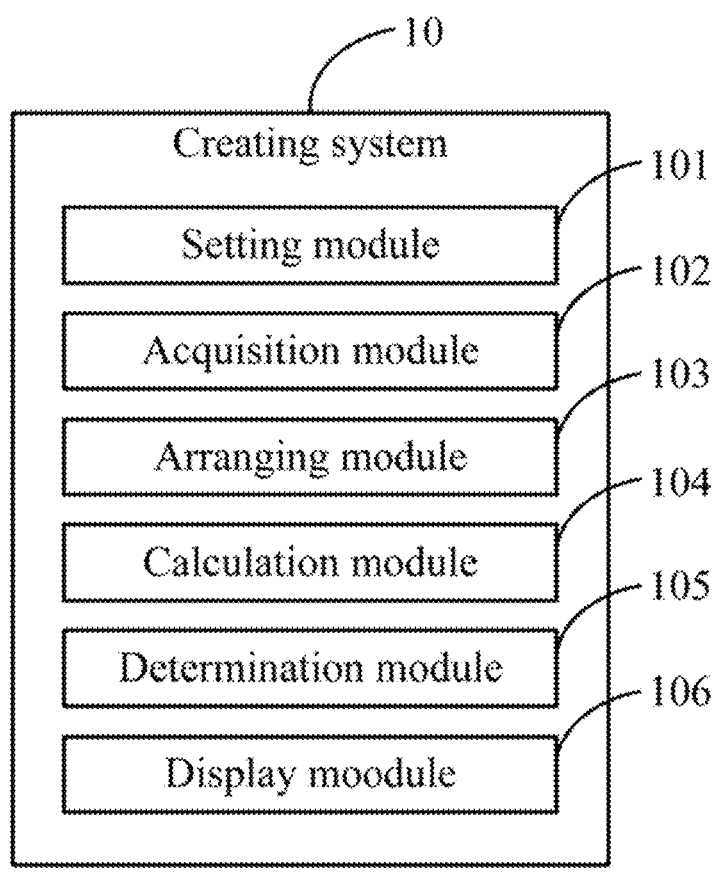
FIG. 2 illustrates a block diagram of an embodiment of function modules of the creating system in FIG. 1.

FIG. 2 illustrates a block diagram of an embodiment of function modules of the creating system 10. The one or more function modules can include computerized code in the form of one or more programs that are stored in the storage unit 20, and executed by the processor 30 to provide functions of the creating system 10. The storage unit 20 can be a dedicated memory, such as an EPROM or a flash memory.

In an embodiment, the creating system 10 includes a setting module 101, an acquisition module 102, an arranging module 103, a calculation module 104, a determination module 105, and a display module 106. Descriptions of the functions of the modules 101-106 are given with reference to FIG. 3.

Figure 3:
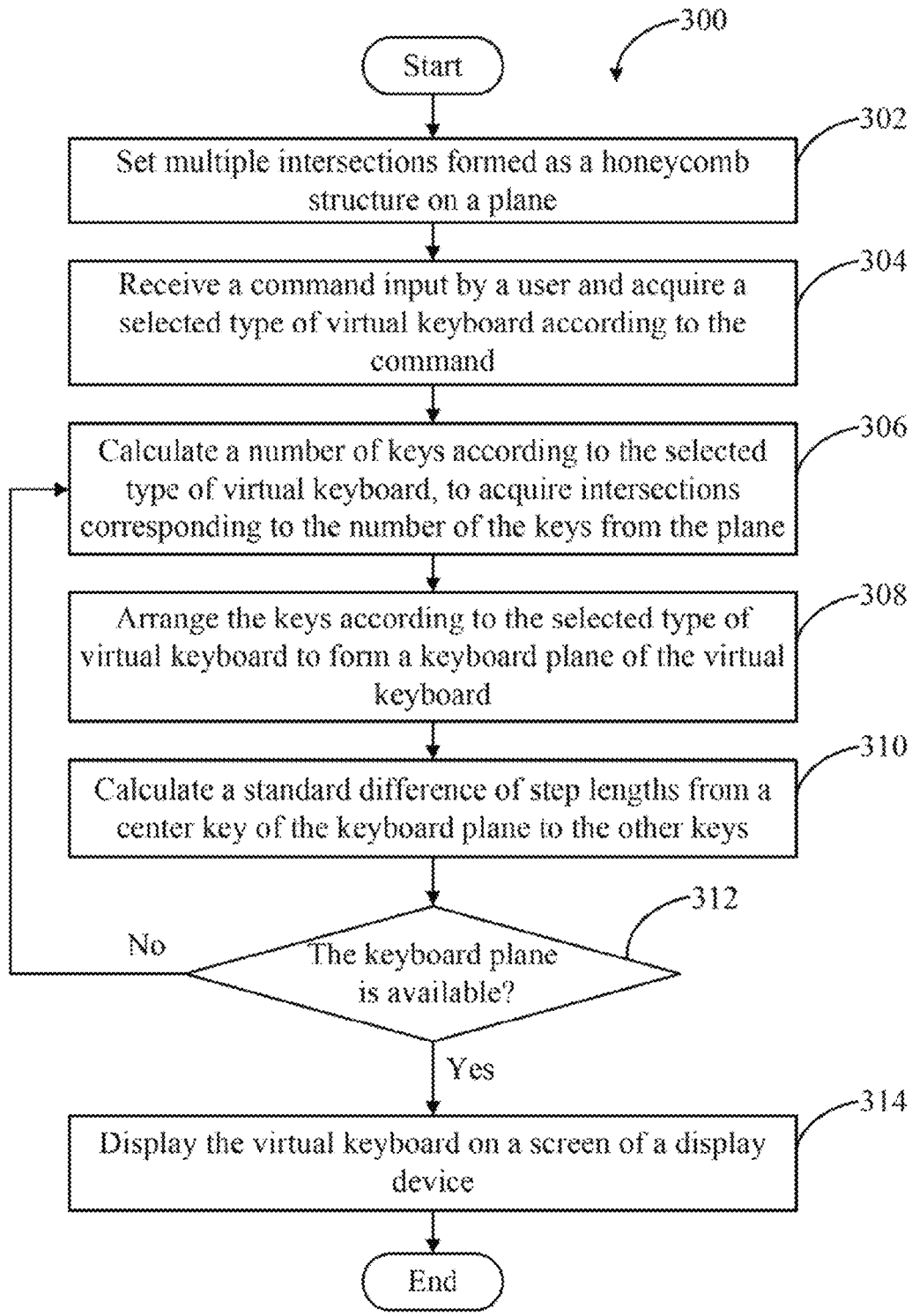
FIG. 3 illustrates a flowchart of an embodiment of a method for creating a virtual keyboard.

Referring to FIG. 3, a flowchart is presented in accordance with an example embodiment of a method 300 for creating the virtual keyboard. The method 300 is provided by way of example, as there are a variety of ways to carry out the method. The method 300 described below can be carried out using the configurations illustrated in FIGS. 1 and 2, for example, and various elements of these figures are referenced in explaining the method 300. Each block shown in FIG. 3 represents one or more processes, methods, or subroutines, carried out in the exemplary method 300. Additionally, the illustrated order of blocks is by example only and the order of the blocks can change. The method 300 can begin at block 302.

Figure 4:
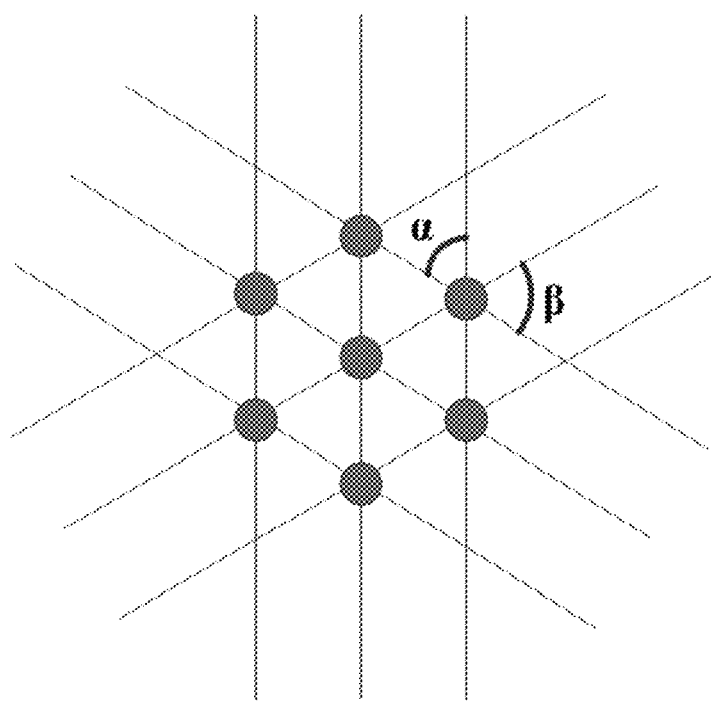
FIG. 4 illustrates a diagrammatic view of an embodiment of intersections formed as a honeycomb structure on a plane.

At block 302, the setting module 101 sets multiple intersections formed as a honeycomb structure on a plane. In the embodiment, as shown in FIG. 4, the setting module 101 draws three groups of parallels on the plane to obtain the intersections. The three groups of parallels are intersected with each other by preset angles (e.g., an angle α and an angle β).

At block 304, the acquisition module 102 receives a command input by a user and acquires a selected type of virtual keyboard according to the command. The type of virtual keyboard may be a virtual phonetic notation keyboard, a virtual English keyboard, or a virtual numeric keyboard, for example. In the embodiment, the remote control device 6 includes a switch button, which is used for switching the types of the virtual keyboard. When the user presses the switch button to select the type of virtual keyboard, the remote control device 6 transmits the command to the creating device 2, so the acquisition module 102 can acquire the selected type of virtual keyboard.

At block 306, the acquisition module 102 calculates a number of keys according to the selected type of virtual keyboard, to acquire intersections corresponding to the number of the keys from the plane. In the embodiment, each intersection is corresponding to a key of the virtual keyboard. It is understood that the acquired intersections are adjacent. Different groups of the acquired intersections can form different shapes of the virtual keyboard.

Figure 5:
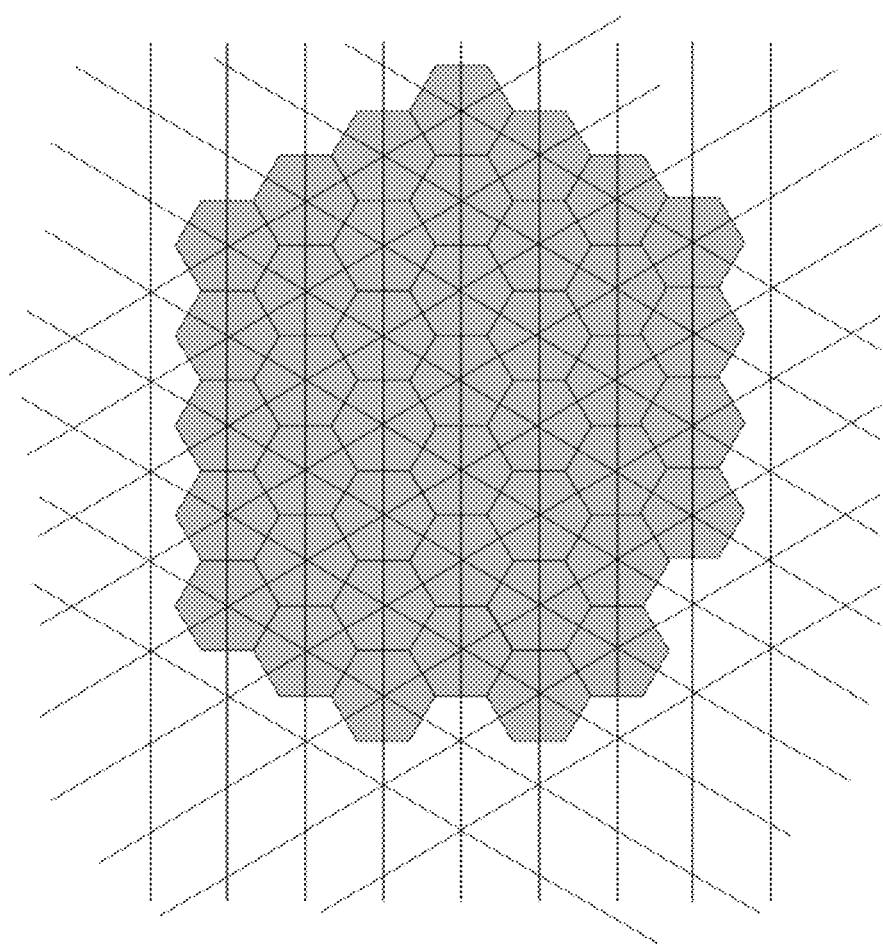
FIG. 5 illustrates a diagrammatic view of an embodiment of intersections corresponding to a number of keys according to a virtual phonetic notation keyboard.
Figure 6:
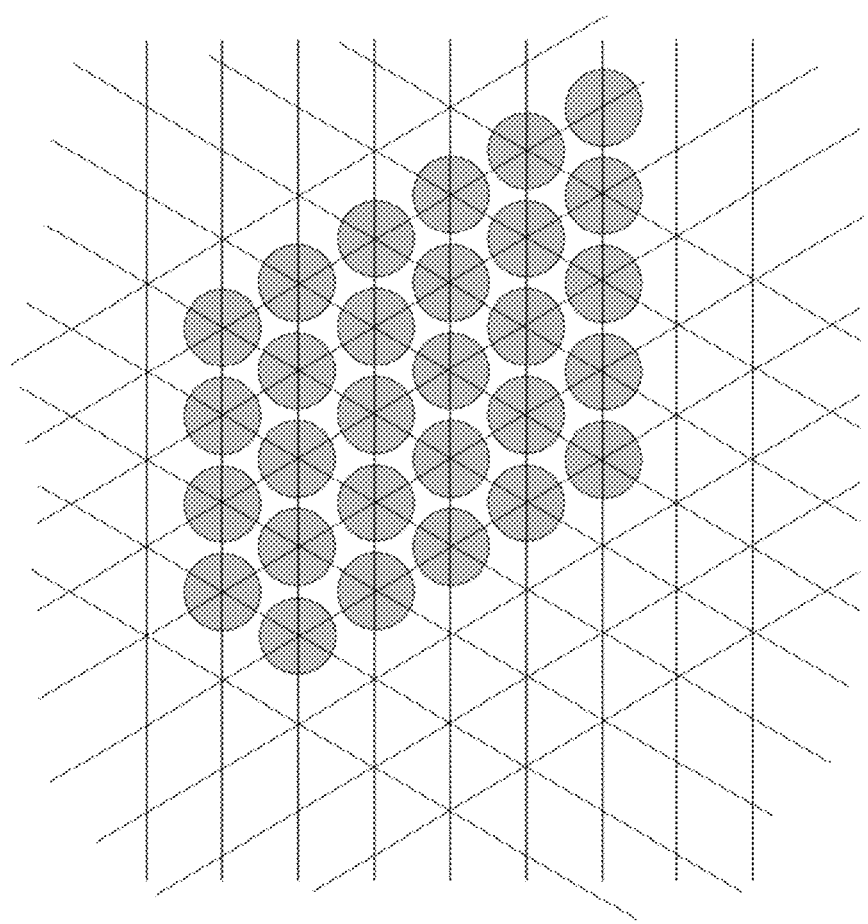
FIG. 6 illustrates a diagrammatic view of an embodiment of intersections corresponding to a number of keys according to a virtual English keyboard.
Figure 7:
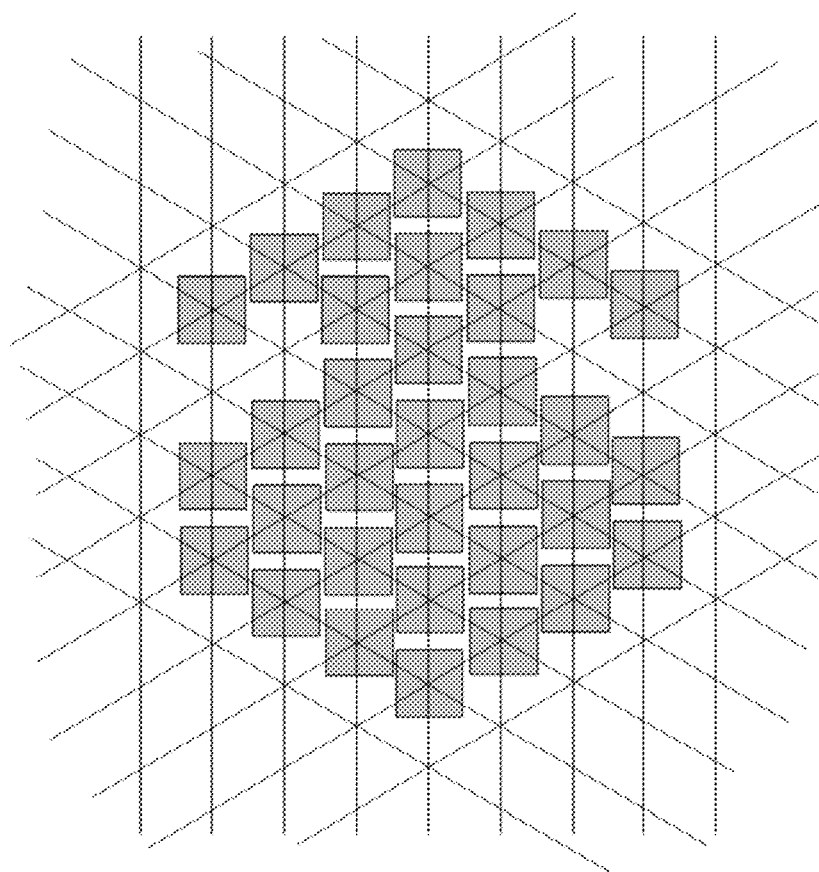
FIG. 7 illustrates a diagrammatic view of an embodiment of intersections corresponding to a number of keys according to a virtual numeric keyboard.

For example, FIG. 5 shows an embodiment of the acquired intersections corresponding to the number of the keys according to the virtual phonetic notation keyboard. FIG. 6 shows an embodiment of the acquired intersections corresponding to the number of the keys according to the virtual English keyboard. FIG. 7 shows an embodiment of the acquired intersections corresponding to the number of the keys according to the virtual numeric keyboard.

Figure 8:
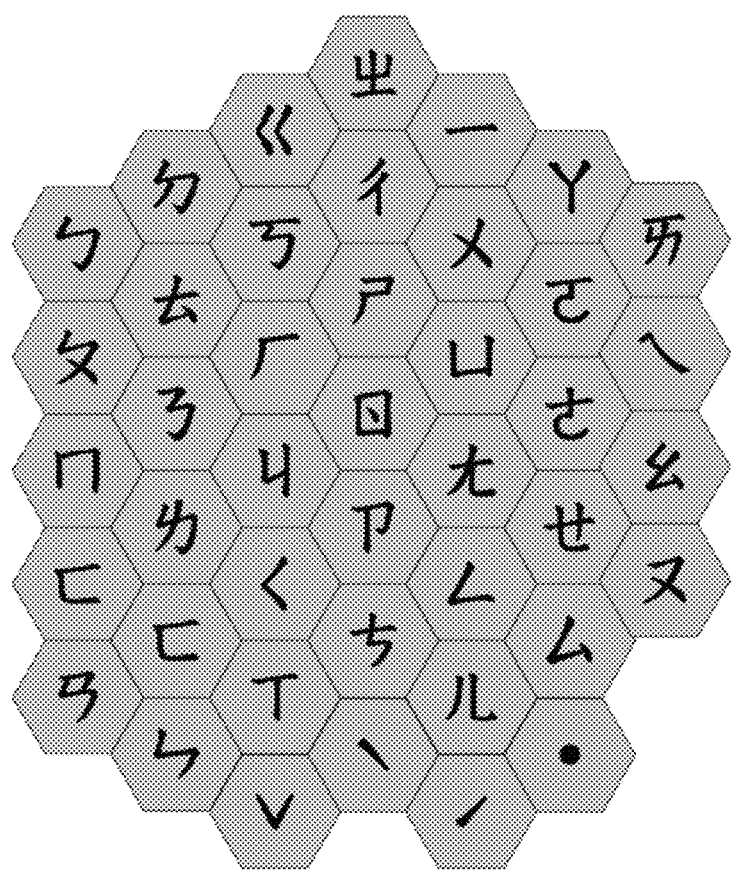
FIG. 8 illustrates a diagrammatic view of an embodiment of a keyboard plane of the virtual phonetic notation keyboard.
Figure 9:
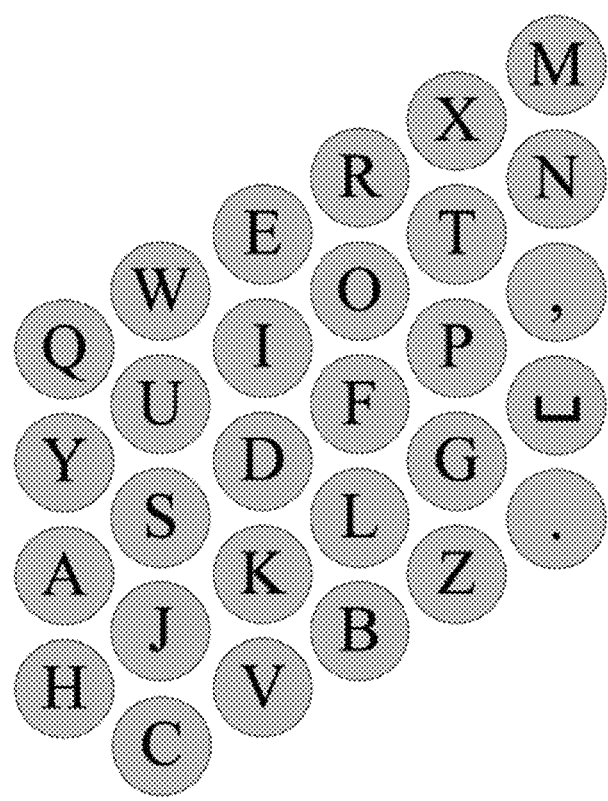
FIG. 9 illustrates a diagrammatic view of an embodiment of a keyboard plane of the virtual English keyboard.
Figure 10:
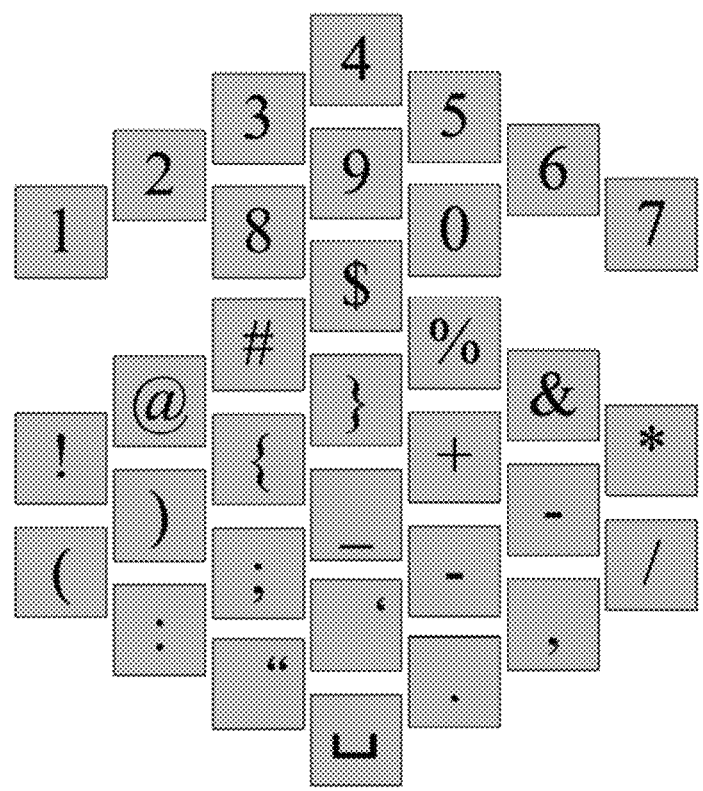
FIG. 10 illustrates a diagrammatic view of an embodiment of a keyboard plane of the virtual numeric keyboard.

At block 308, the arranging module 103 arranges the keys according to the selected type of virtual keyboard to form a keyboard plane of the virtual keyboard. For example, if the selected type of virtual keyboard is the virtual English keyboard, the arranging module 103 arranges a key "A" to a first intersection, and arranges a key "B" to a second intersection, and so on, to form the keyboard plane including all English keys. FIG. 8 shows an embodiment of the keyboard plane of the virtual phonetic notation keyboard. FIG. 9 shows an embodiment of the keyboard plane of the virtual English keyboard. FIG. 10 shows an embodiment of the keyboard plane of the virtual numeric keyboard.

At block 310, the calculation module 104 calculates a standard difference (SD) of step lengths from a center key of the keyboard plane to the other keys. The step length is a time of moving from the center key to each of the other keys, which is equal to a time of pressing the remote control device 6 to select the one of the other keys. The calculation module 104 can calculate the SD according to a formula represented as $$SD = \sqrt{\frac{1}{n-1} \sum_{i=1}^{n-1} (x_i - x_c)^2},$$

wherein n is the number of the keys of the virtual keyboard, $x_c$ is a position of the center key, $x_i$ is a position of each of the other keys, $x_i - x_c$ is the step length from the center key to each of the other keys.

Figure 11:
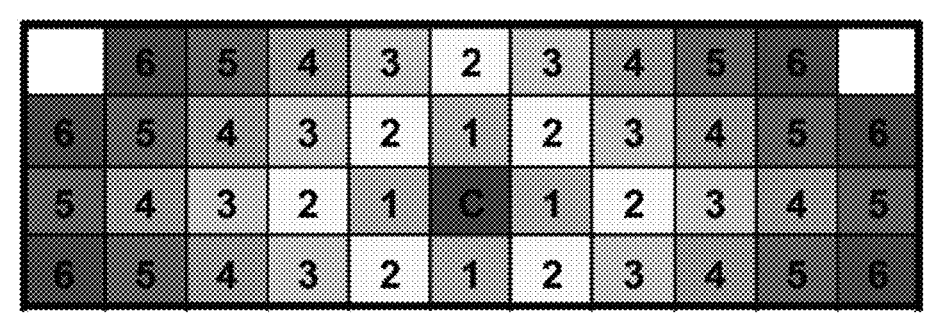

FIG. 11 shows an embodiment of step lengths from the center key to the other keys of a present phonetic notation keyboard. The SD of the step lengths of the present phonetic notation keyboard is $$SD = \sqrt{\frac{1}{41}(1^2 \times 4 + 2^2 \times 7 + 3^2 \times 8 + 4^2 \times 8 + 5^2 \times 8 + 6^2 \times 6)} = 3.97.$$

Figure 12:
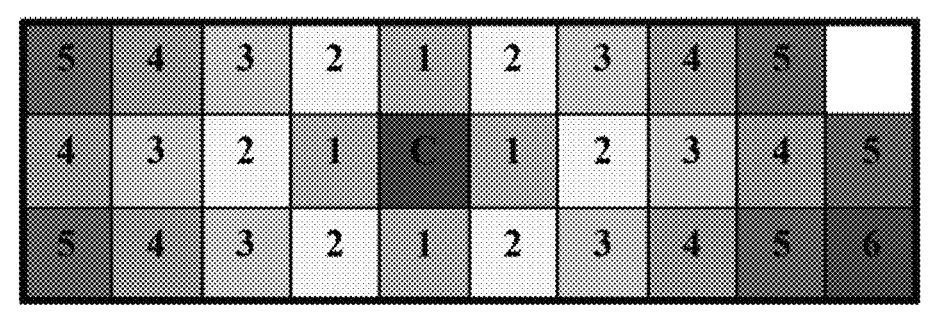

FIG. 12 shows an embodiment of step lengths from the center key to the other keys of a present English keyboard. The SD of the step lengths of the present English keyboard is $$SD = \sqrt{\frac{1}{28}(1^2 \times 4 + 2^2 \times 6 + 3^2 \times 6 + 4^2 \times 6 + 5^2 \times 5 + 6^2 \times 1)} = 3.47.$$

Figure 13:
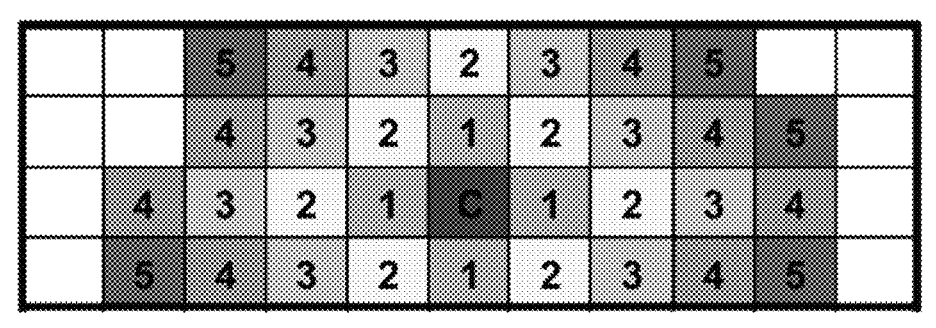

FIG. 13 shows an embodiment of step lengths from the center key to the other keys of a present numeric keyboard. The SD of the step lengths of the present numeric keyboard is $$SD = \sqrt{\frac{1}{32}(1^2 \times 4 + 2^2 \times 7 + 3^2 \times 8 + 4^2 \times 8 + 5^2 \times 5)} = 3.34.$$

Figure 14:
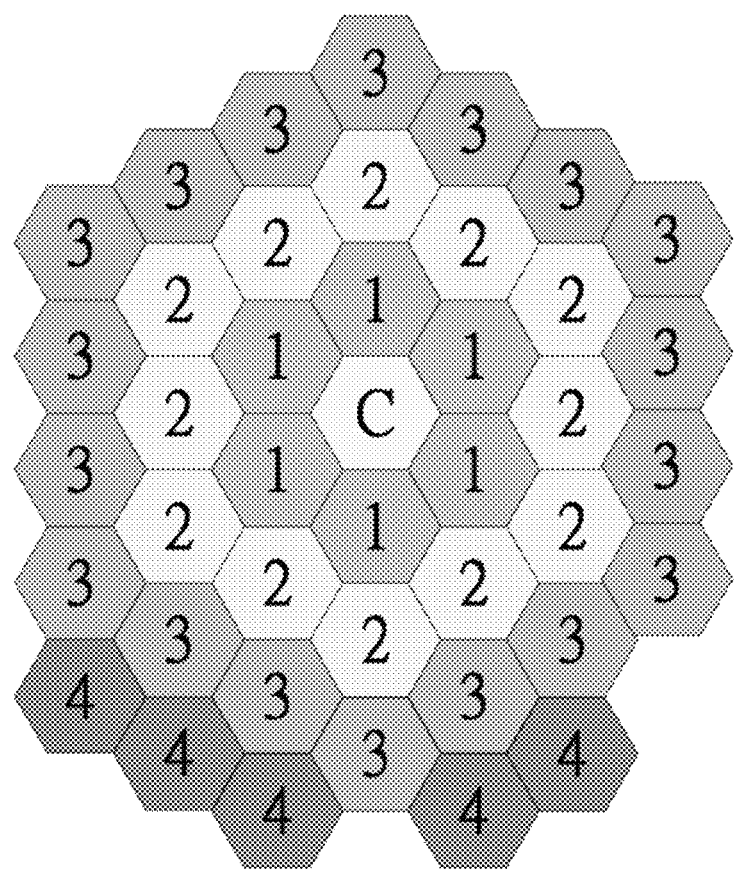
FIG. 14 illustrates a diagrammatic view of an embodiment of step lengths from a center key to the other keys of the virtual phonetic notation keyboard.

FIG. 14 shows an embodiment of step lengths from the center key to the other keys of the virtual phonetic notation keyboard. The SD of the step lengths of the virtual phonetic notation keyboard is $$SD = \sqrt{\frac{1}{41}(1^2 \times 6 + 2^2 \times 12 + 3^2 \times 18 + 4^2 \times 5)} = 2.68.$$

Figure 15:
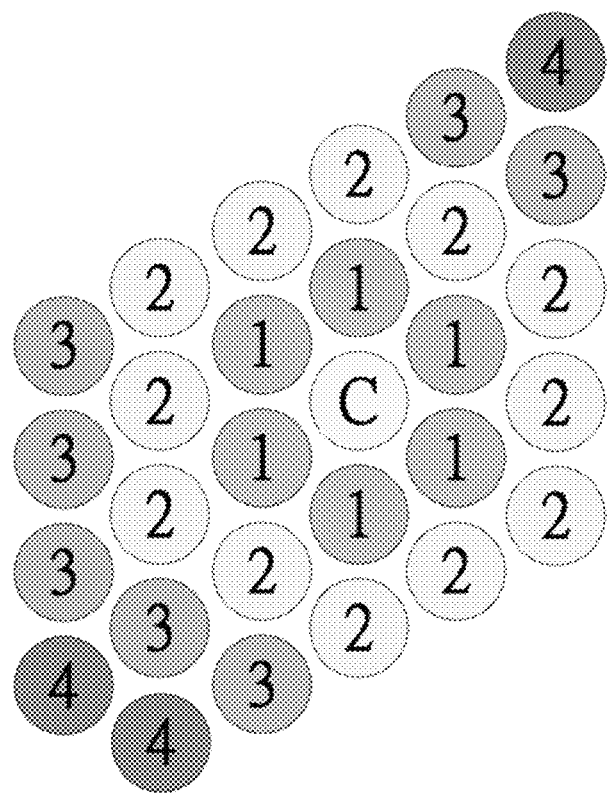
FIG. 15 illustrates a diagrammatic view of an embodiment of step lengths from a center key to the other keys of the virtual English keyboard.

FIG. 15 shows an embodiment of step lengths from the center key to the other keys of the virtual English keyboard. The SD of the step lengths of the virtual English keyboard is $$SD = \sqrt{\frac{1}{28}(1^2 \times 6 + 2^2 \times 12 + 3^2 \times 7 + 4^2 \times 3)} = 2.42.$$

Figure 16:
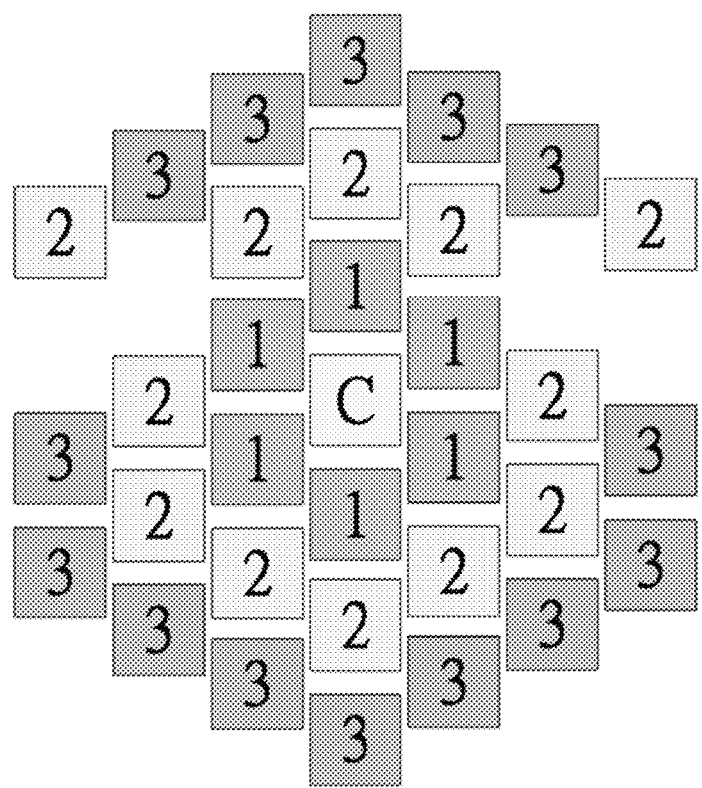
FIG. 16 illustrates a diagrammatic view of an embodiment of step lengths from a center key to the other keys of the virtual numeric keyboard.

FIG. 16 shows an embodiment of step lengths from the center key to the other keys of the virtual numeric keyboard. The SD of the step lengths of the virtual numeric keyboard is $$SD = \sqrt{\frac{1}{32}(1^2 \times 6 + 2^2 \times 13 + 3^2 \times 14)} = 2.39.$$

According to the calculated results, it is understood that the SD of the step lengths of the virtual keyboards are less than the SD of the step lengths of corresponding present keyboards.

At block 312, the determination module 105 determines whether the keyboard plane is available according to the calculated SD. If the calculated SD is less than a preset value, the determination module 105 determines the keyboard plane is available, and the method 300 implements block 314. If the calculated SD is not less than the preset value, the determination module 105 determines the keyboard plane is unavailable, and the method 300 returns to block 306. In the embodiment, the preset value is the SD of the step lengths corresponding to the present keyboard, for example, the present phonetic notation keyboard, the present English keyboard, or the present numeric keyboard in FIGS. 11-13.

At block 314, the display module 106 displays the virtual keyboard on a screen (not shown) of the display device 4. Then the user can operate the virtual keyboard through the remote control device 6 to input characters. In the embodiment, the remote control device 6 may include an up directional control button, a down directional control button, an upper left directional control button, an upper right directional control button, a lower left directional control button, and a lower right directional control button. The user can press the directional control buttons to select keys of the virtual keyboard to input corresponding characters.

The embodiments shown and described above are only examples. Many details are often found in the art such as the other features of a device and method for creating virtual keyboard. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A computer-implemented method, executable by a processor of a creating device, the method comprising:
setting multiple intersections formed as a honeycomb structure on a plane;
acquiring a selected type of virtual keyboard according to a command input;
calculating a number of keys according to the selected type of virtual keyboard to acquire intersections corresponding to the number of the keys from the plane;
arranging the keys according to the selected type of virtual keyboard to form a keyboard plane of the virtual keyboard;
calculating a standard difference of step lengths from a center key of the keyboard plane to the other keys;
determining whether the keyboard plane is available according to the calculated standard difference; and
displaying the virtual keyboard on a screen of a display device, in event the keyboard plane is available.

2. The method as claimed in claim 1, wherein the step of setting multiple intersections formed as a honeycomb structure on the plane further comprises:
drawing three groups of parallels intersected with each other by preset angles on the plane to obtain the intersections.

3. The method as claimed in claim 1, wherein the standard difference is calculated according to a formula represented as $$SD = \sqrt{\frac{1}{n-1} \sum_{i=1}^{n-1} (x_i - x_c)^2},$$

where n is the number of the keys of the virtual keyboard, $x_c$ is a position of the center key, $x_i$ is a position of each of the other keys, $x_i - x_c$ is the step length from the center key to each of the other keys.

4. The method as claimed in claim 1, wherein the step of determining whether the keyboard plane is available further comprises:
the keyboard plane is determined available, if the calculated standard difference is less than a preset value, and, if not, is determined unavailable.

5. The method as claimed in claim 1, wherein the keys of the virtual keyboard are selected by pressing directional control buttons of a remote control device to input corresponding characters.

6. A non-transitory storage medium, storing a set of instructions, the set of instructions being executed by a processor of a creating device, to perform a method comprising:
setting multiple intersections formed as a honeycomb structure on a plane;
acquiring a selected type of virtual keyboard according to a command input;
calculating a number of keys according to the selected type of virtual keyboard to acquire intersections corresponding to the number of the keys from the plane;
arranging the keys according to the selected type of virtual keyboard to form a keyboard plane of the virtual keyboard;
calculating a standard difference of step lengths from a center key of the keyboard plane to the other keys;
determining whether the keyboard plane is available according to the calculated standard difference; and
displaying the virtual keyboard on a screen of a display device, in event the keyboard plane is available.

7. The non-transitory storage medium as claimed in claim 6, wherein the step of setting multiple intersections formed as a honeycomb structure on the plane further comprises:
drawing three groups of parallels intersected with each other by preset angles on the plane to obtain the intersections.

8. The non-transitory storage medium as claimed in claim 6, wherein the standard difference is calculated according to a formula represented as $$SD = \sqrt{\frac{1}{n-1}\sum_{i=1}^{n-1}(x_i - x_c)^2},$$

where n is the number of the keys of the virtual keyboard, $x_c$ is a position of the center key, $x_i$ is a position of each of the other keys, $x_i - x_c$ is the step length from the center key to each of the other keys.

9. The non-transitory storage medium as claimed in claim 6, wherein the step of determining whether the keyboard plane is available further comprises:
the keyboard plane is determined available, if the calculated standard difference is less than a preset value, and, if not, is determined unavailable.

10. The non-transitory storage medium as claimed in claim 6, wherein the keys of the virtual keyboard are selected by pressing directional control buttons of a remote control device to input corresponding characters.

11. A device, the creating device comprising:
at least one processor;
a storage unit; and
one or more programs that are stored in the storage unit and executed by the at least one processor, the one or more programs comprising instructions for:
setting multiple intersections formed as a honeycomb structure on a plane;
acquiring a selected type of virtual keyboard according to a command input;
calculating a number of keys according to the selected type of virtual keyboard to acquire intersections corresponding to the number of the keys from the plane;
arranging the keys according to the selected type of virtual keyboard to form a keyboard plane of the virtual keyboard;
calculating a standard difference of step lengths from a center key of the keyboard plane to the other keys;
determining whether the keyboard plane is available according to the calculated standard difference; and
displaying the virtual keyboard on a screen of a display device, in event the keyboard plane is available.

12. The device as claimed in claim 11, wherein the step of setting multiple intersections formed as a honeycomb structure on the plane further comprises:
drawing three groups of parallels intersected with each other by preset angles on the plane to obtain the intersections.

13. The device as claimed in claim 11, wherein the standard difference is calculated according to a formula represented as $$SD = \sqrt{\frac{1}{n-1}\sum_{i=1}^{n-1}(x_i - x_c)^2},$$

where n is the number of the keys of the virtual keyboard, $x_c$ is a position of the center key, $x_i$ is a position of each of the other keys, $x_i - x_c$ is the step length from the center key to each of the other keys.

14. The device as claimed in claim 11, wherein the step of determining whether the keyboard plane is available further comprises:
the keyboard plane is determined available, if the calculated standard difference is less than a preset value, and, if not, is determined unavailable.

15. The device as claimed in claim 11, wherein the keys of the virtual keyboard are selected by pressing directional control buttons of a remote control device to input corresponding characters.

* * * * *